(12) United States Patent
Suriki

(10) Patent No.: US 12,743,107 B2
(45) Date of Patent: Sep. 22, 2026

(54) TRAVELING VEHICLE SYSTEM

(71) Applicant: Murata Machinery, Ltd., Kyoto (JP)

(72) Inventor: Keiichiro Suriki, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 19/129,771

(22) PCT Filed: Sep. 5, 2023

(86) PCT No.: PCT/JP2023/032387

§ 371 (c)(1),
(2) Date: May 14, 2025

(87) PCT Pub. No.: WO2024/111216

PCT Pub. Date: May 30, 2024

(65) Prior Publication Data

US 2026/0186509 A1 Jul. 2, 2026

(30) Foreign Application Priority Data

Nov. 21, 2022 (JP) ................................ 2022-185757

(51) Int. Cl.
*G05D 1/69* (2024.01)
*G05D 107/70* (2024.01)
(Continued)

(52) U.S. Cl.
CPC ........... *G05D 1/69* (2024.01); *G05D 2107/70* (2024.01); *G05D 2109/14* (2024.01); *G05D 2111/36* (2024.01)

(58) Field of Classification Search
CPC .. G05D 1/69; G05D 2107/70; G05D 2109/14; G05D 2111/36
See application file for complete search history.

(56) References Cited

U.S. PATENT DOCUMENTS 11,981,363 B1 * 5/2024 Dunn ...................... B61L 3/127
12,091,067 B2 * 9/2024 Bienek ................ B61L 15/0054
(Continued)

FOREIGN PATENT DOCUMENTS

CN 111781928 A 10/2020
CN 112424719 A 2/2021
(Continued)

*Primary Examiner* — Sze-Hon Kong
(74) *Attorney, Agent, or Firm* — Keating & Bennett, LLP

(57) ABSTRACT

A traveling vehicle system includes a plurality of traveling vehicles to travel in a plurality of sections, a storage, and a controller. When each of the traveling vehicles has received a signal transmitted from the controller, each traveling vehicle receives the signal as valid information only when the signal contains information indicating the vehicle itself as a destination. After each of the traveling vehicles has switched a communication method based on information stored in the storage in accordance with one of the sections that the traveling vehicle has entered, even when a signal received by the communication method after this switching contains information indicating a vehicle other than the vehicle itself as a destination, the traveling vehicle receives the signal as valid information and determines that communication with the controller has been established.

7 Claims, 4 Drawing Sheets

(51) Int. Cl.
*G05D 109/10* (2024.01)
*G05D 111/30* (2024.01)

(56) References Cited

U.S. PATENT DOCUMENTS

| | | | | |
|---|---|---|---|---|
| 2017/0113707 | A1* | 4/2017 | Ghaly | B61L 15/0058 |
| 2018/0359811 | A1* | 12/2018 | Verzun | H04L 12/28 |
| 2019/0077432 | A1* | 3/2019 | Itagaki | B61L 15/0027 |
| 2019/0077433 | A1* | 3/2019 | Itagaki | B61L 15/0027 |
| 2021/0331708 | A1 | 10/2021 | Takahara | |
| 2022/0007186 | A1* | 1/2022 | Loch | B61L 15/0027 |
| 2022/0055669 | A1* | 2/2022 | Wolf | B61L 15/0036 |
| 2023/0129585 | A1* | 4/2023 | Haas | G08G 1/22<br>246/169 R |
| 2024/0101175 | A1* | 3/2024 | Dunn | B61L 27/04 |
| 2024/0172079 | A1* | 5/2024 | Koshino | H04W 36/0009 |

FOREIGN PATENT DOCUMENTS

| | | |
|---|---|---|
| JP | 4366974 B2 | 11/2009 |
| JP | 5360034 B2 | 12/2013 |

* cited by examiner

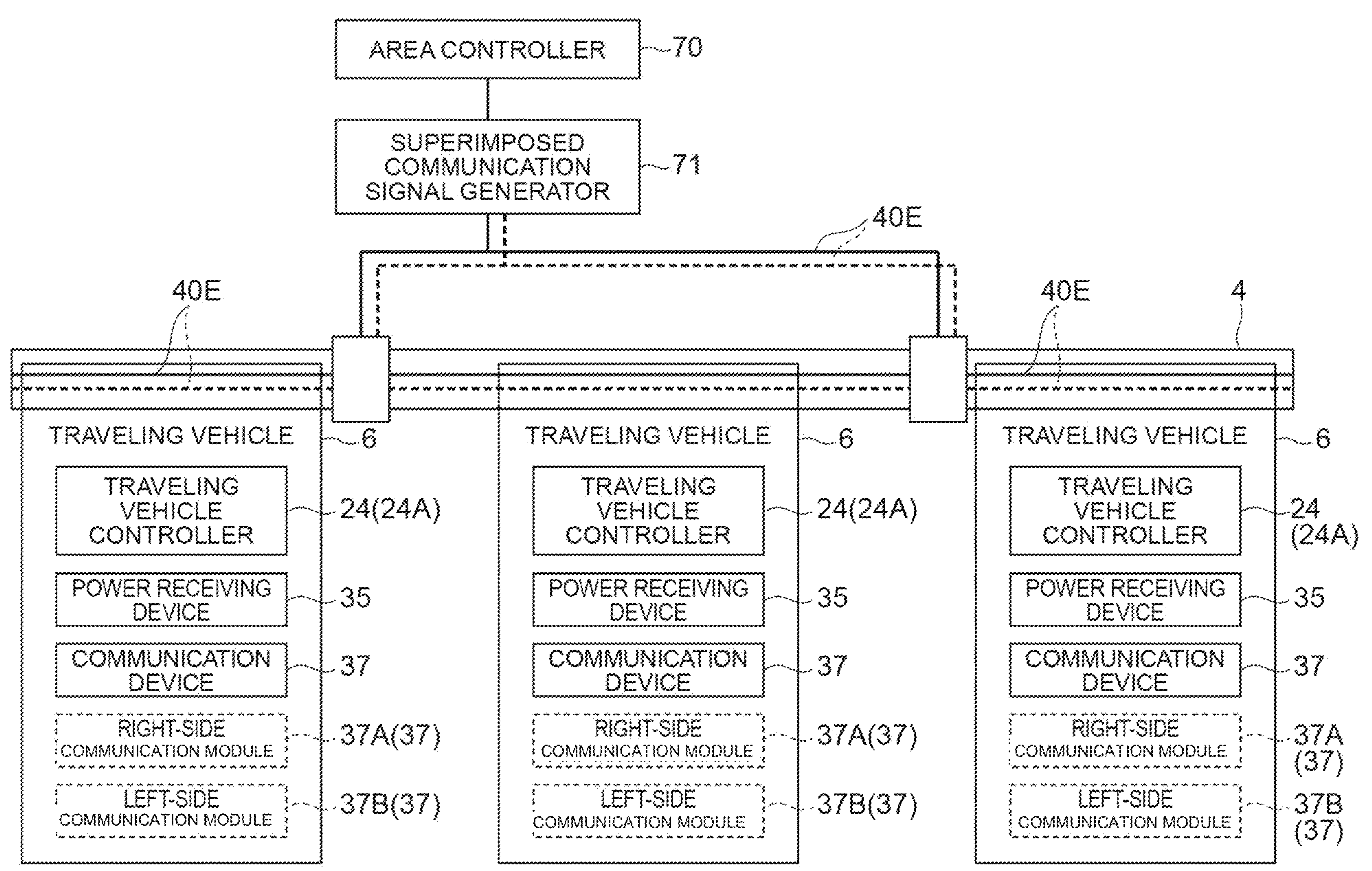
Fig.3
AREA CONTROLLER
70
SUPERIMPOSED COMMUNICATION SIGNAL GENERATOR
71
40E
40E
40E
4
TRAVELING VEHICLE
6
TRAVELING VEHICLE CONTROLLER
24(24A)
POWER RECEIVING DEVICE
35
COMMUNICATION DEVICE
37
RIGHT-SIDE COMMUNICATION MODULE
37A(37)
LEFT-SIDE COMMUNICATION MODULE
37B(37)
TRAVELING VEHICLE
6
TRAVELING VEHICLE CONTROLLER
24(24A)
POWER RECEIVING DEVICE
35
COMMUNICATION DEVICE
37
RIGHT-SIDE COMMUNICATION MODULE
37A(37)
LEFT-SIDE COMMUNICATION MODULE
37B(37)
TRAVELING VEHICLE
6
TRAVELING VEHICLE CONTROLLER
24 (24A)
POWER RECEIVING DEVICE
35
COMMUNICATION DEVICE
37
RIGHT-SIDE COMMUNICATION MODULE
37A (37)
LEFT-SIDE COMMUNICATION MODULE
37B (37)

A1
A2
S11
S12
S13
S14
4
4
40E
40E
40E
40E
6
6
6
37A
37A
37A
37B
37B
37B
37
37
37

TRAVELING VEHICLE SYSTEM

BACKGROUND OF THE INVENTION

1. Field of the Invention

The present invention relates to traveling vehicle systems.

2. Description of the Related Art

A traveling vehicle system including traveling vehicles configured to travel on a track provided on a ceiling is known. For example, Japanese Patent No. 5360034 discloses a traveling vehicle system in which a controller sequentially inquires of (polls) each of traveling vehicles, and a traveling vehicle that has received an inquiry of itself from the controller reports its own status to the controller. The controller of this traveling vehicle system can know the status of a plurality of the traveling vehicles under its control and can transmit a command to a specific traveling vehicle.

In the traveling vehicle system, as a result of updating or expanding system facilities such as a communication facility and a track facility that form the traveling vehicle system, there may be a plurality of sections where communication methods between the controller and the traveling vehicles differ from each other in tracks forming the traveling vehicle system. Information on the communication methods for the respective sections is stored in advance, for example, in a storage of the controller. The traveling vehicles can communicate with the controller by appropriately controlling communication equipment in the traveling vehicles based on the information on the communication methods stored in the storage.

SUMMARY OF THE INVENTION

However, for example, if the timing of updating or expanding the system facilities and the timing of updating the information on the communication methods in the storage are out of sync with each other, communication between the controller and a traveling vehicle may become impossible when the traveling vehicle enters a section for which a communication mode different from the actual communication mode is stored in the storage, and a situation may occur in which the controller cannot control the traveling vehicle properly. Thus, it is desired that, after the traveling vehicle has switched the mode of communication equipment, whether communication with the controller has been established be checked as soon as possible.

In view f this, example embodiments of the present invention provide traveling vehicle systems that each shorten the time required to check whether communication between a controller and a traveling vehicle has been established after switching a communication method.

A traveling vehicle system according to an example embodiment of the present invention includes a plurality of traveling vehicles configured to be able to select one of a plurality of communication methods and travel in a plurality of sections, a storage in which the communication methods allowing communication for the respective sections are associated with each other and stored, and a controller configured or programmed to transmit and receive a signal through the corresponding communication method selected by each of the traveling vehicles, each of the traveling vehicles being configured to, when having received the signal transmitted from the controller, receive the signal as valid information only when the signal contains information indicating the vehicle itself as a destination, wherein after each of the traveling vehicles has switched the communication method stored in the storage in accordance with one of the sections that the traveling vehicle has entered, even when the signal received by the communication method after this switching contains information indicating a vehicle other than the vehicle itself as a destination, the traveling vehicle receives the signal as valid information and determines that communication with the controller has been established.

Destinations other than the vehicle itself here may include the controller in addition to other vehicles that are traveling vehicles other than the vehicle itself. In the traveling vehicle system thus configured, after switching the communication method, a signal is normally received as valid information through the communication method after the switching only if the signal contains information indicating the vehicle itself as a destination, but the signal is exceptionally received as valid information even if the signal contains information indicating a vehicle other than the vehicle itself as a destination. The traveling vehicle system then determines that communication with the controller has been established when the traveling vehicle after switching the communication method has received such information. By this control, even if the controller has not transmitted a signal addressed to the vehicle itself after switching the communication method, it can be determined that communication with the controller has been established based on a signal addressed to a vehicle other than the vehicle itself. Consequently, the time required to check whether communication between the controller and the traveling vehicle has been established after switching the communication method is shortened.

In a traveling vehicle system according to an example embodiment of the present invention, the traveling vehicle may travel along a track, the track may include a communication line along the track, and the traveling vehicle and the controller may be configured or programmed to communicate with each other via the communication line. With this configuration, even in the traveling vehicle system in which communication is performed between the traveling vehicle and the controller via the communication line, the time required to check whether communication between the controller and the traveling vehicle has been established is shortened.

In a traveling vehicle system according to an example embodiment of the present invention, the communication line may also define and function as a feeder line for feeding power to the traveling vehicle. With this configuration, the communication line also functions as the feeder line, resulting in a simple facility configuration and facilitating wiring work when the track is constructed.

In a traveling vehicle system according to an example embodiment of the present invention, the switching of the communication method may be switching of a communication speed between the traveling vehicle and the controller. With this configuration, even when the communication speed between the traveling vehicle and the controller has been switched, the time required to check whether communication between the controller and the traveling vehicle has been established is shortened. In other words, this configuration enables traveling across areas with different communication speeds. This allows communication speeds to coexist in the track included in the traveling vehicle system, making it easier to update the existing facilities and additionally install (add) a new facility.

In a traveling vehicle system according to an example embodiment of the present invention, a communication device provided to each of the traveling vehicles may include a left-side communication module configured or programmed to communicate only with the communication line in a left-side wiring section and a right-side communication module configured or programmed to communicate only with the communication line in a right-side wiring section, and the switching of the communication method may be switching between the left-side communication module and the right-side communication module. With this configuration, even when switching is performed between the left-side communication module and the right-side communication module, the time required to check whether communication between the controller and the traveling vehicle has been established is shortened.

In a traveling vehicle system according to an example embodiment of the present invention, the controller may be configured or programmed to transmit the signal to the traveling vehicles traveling in turn. With this configuration, even when what is called polling communication is performed between the controller and the traveling vehicle, the time required to check whether communication between the controller and the traveling vehicle has been established is shortened.

In a traveling vehicle system according to an example embodiment of the present invention, each of the traveling vehicles may, after switching the communication method, restore the switched communication method to the communication method before being switched when it has not been determined that communication has been established within a predetermined time. With this configuration, even if there is a gap between the timing of updating or expanding the system facilities such as a communication facility and a track facility that form the traveling vehicle system and the timing of updating the information in the storage, a situation in which communication is not established between the controller and the traveling vehicle can be prevented and communication between the controller and the traveling vehicle can be continued.

According to example embodiments of the present invention, the time required to check whether communication between the controller and the traveling vehicle has been established after switching the communication method is shortened.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a functional block diagram illustrating a functional configuration of the traveling vehicle system.

DETAILED DESCRIPTION OF THE EXAMPLE EMBODIMENTS

Traveling vehicle systems according to example embodiments of the present invention will now be described with reference to the drawings. In the description of the drawings, like elements are designated by like reference signs, and duplicate description is omitted.

Figure 1:
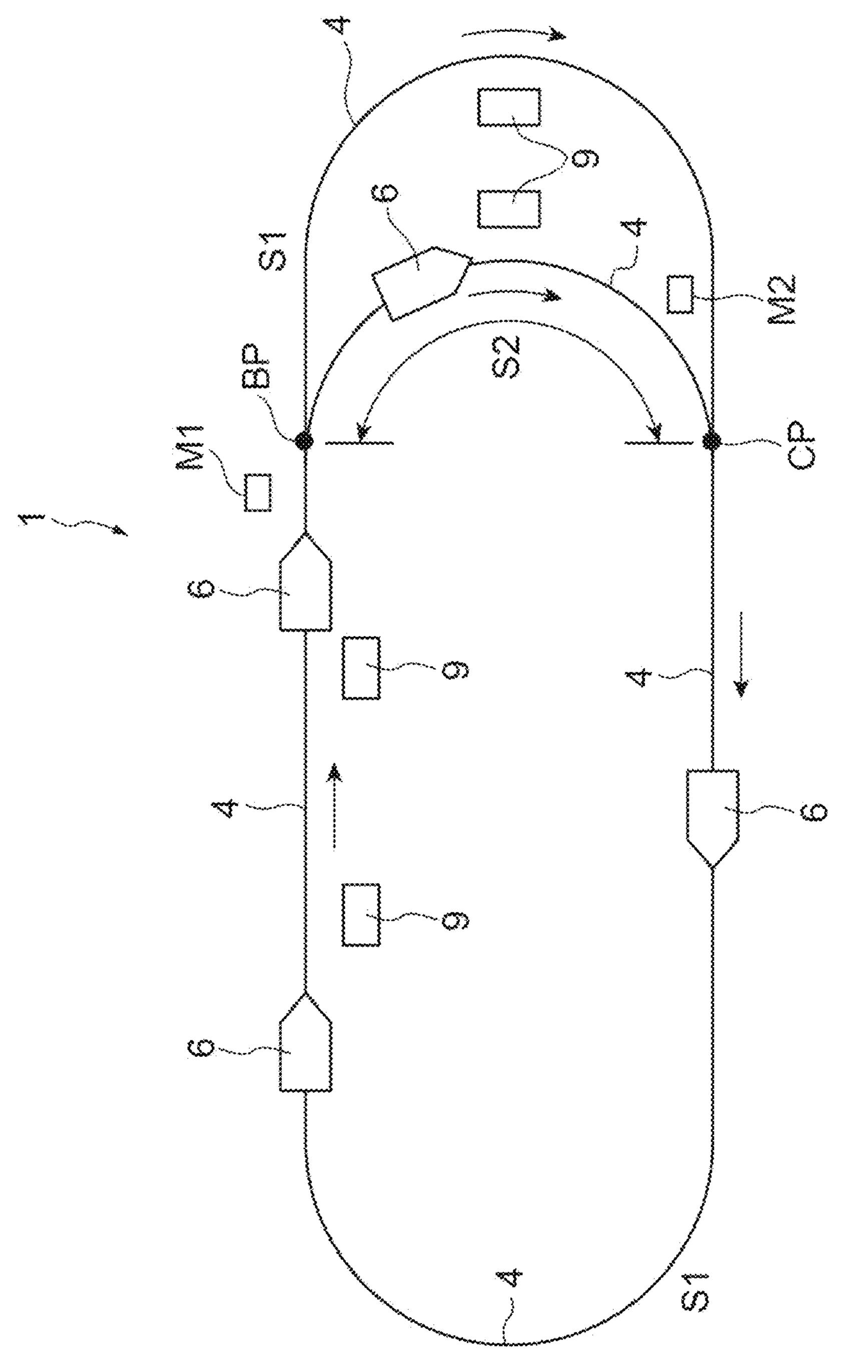
FIG. 1 is a schematic plan view illustrating a traveling vehicle system according to an example embodiment of the present invention.
Figure 2:
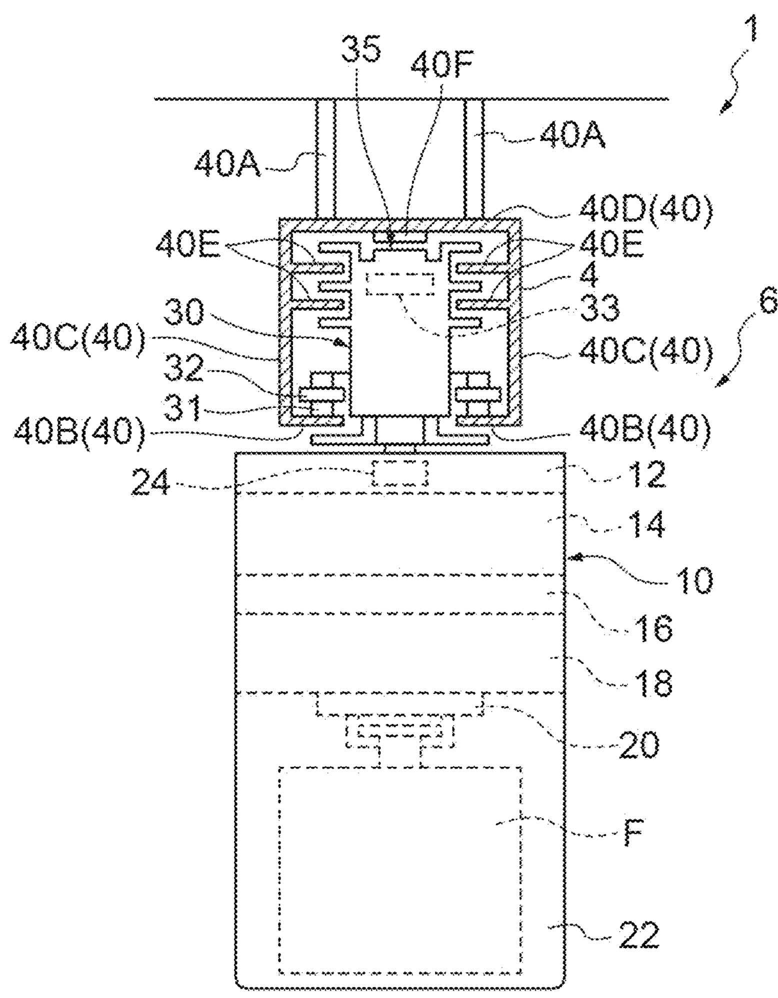
FIG. 2 is a schematic front view of an overhead traveling vehicle in FIG. 1 when viewed from a traveling direction.

As illustrated in FIGS. 1 and 2, a traveling vehicle system 1 is a system to transport an article F between placement sections 9 and 9 by using an overhead traveling vehicle 6 (hereinafter, simply referred to as "traveling vehicle 6") movable along a track 4. Examples of the article F include a front opening unified pod (FOUP) storing a plurality of semiconductor wafers, a container storing a glass substrate, a container such as a reticle pod, and common parts. Herein, the traveling vehicle system 1 in which, for example, the traveling vehicle 6 travels along the one-way track 4 laid on a ceiling or the like in a factory or the like will be described as an example. The traveling vehicle system 1 includes the track 4, a plurality of the traveling vehicles 6, a plurality of the placement sections 9, and an area controller (controller) 70 (see FIG. 3).

The track 4 is laid, for example, in the vicinity of a ceiling that is a space above a worker's head. The track 4 is, for example, suspended from the ceiling. The track 4 is a predetermined traveling path for the traveling vehicles 6 to travel. The track 4 is supported by struts 40A and 40A. The track 4 of the traveling vehicle system 1 defines a main-line section S1 for traveling in one direction around a predetermined area and a branch-line section S2 branching from and merging into the main-line section S1.

The track 4 includes a tubular body 40 including a pair of lower surface portions 40B, a pair of side surface portions 40C and 40C, and a top surface portion 40D, a power feeder (communication line/feeder line) 40E, and a magnetic plate 40F. The lower surface portions 40B, 40B extend in the traveling direction of the traveling vehicle 6 and define a lower surface of the body 40. The lower surface portions 40B, 40B are plate-shaped members to allow traveling rollers 31 of the traveling vehicle 6 to roll and travel. The side surface portions 40C, 40C extend in the traveling direction of the traveling vehicle 6 and define side surfaces of the body 40. The top surface portion 40D extends in the traveling direction of the traveling vehicle 6 and defines an upper surface of the body 40.

The power feeder 40E is a configured to transmit and receive signals (superimposed communication) with the traveling vehicle 6 and supply electricity to a power receiving device 35 of the traveling vehicle 6. The power feeder 40E is a communication line fixed to each of the pair of side surface portions 40C and 40C and extending along the traveling direction. In other words, the communication line also defines and functions as a feeder line for feeding power to the traveling vehicle 6. The power feeder 40E supplies electricity to the power receiving device 35 in a contactless manner. The magnetic plate 40F causes a linear DC motor (LDM) 55 of the traveling vehicle 6 to produce magnetic force for traveling or stopping. The magnetic plate 40F is fixed to the top surface portion 40D and extends along the traveling direction.

The traveling vehicle 6 travels along the track 4 and transports the article F. The traveling vehicle 6 is configured to be able to transfer the article F. The traveling vehicle 6 is an automated overhead traveling vehicle. The number of traveling vehicles 6 included in the traveling vehicle system 1 is not particularly limited and is more than one. The traveling vehicle 6 includes a main body 10 and a traveling unit 30. The main body 10 includes a body frame 12, a lateral feed unit 14, a θ drive 16, an elevation driver 18, an elevation stage 20, a front-back frame 22, and a traveling vehicle controller 24.

The lateral feed unit 14 laterally feeds the θ drive 16, the elevation driver 18, and the elevation stage 20 collectively in a direction perpendicular to the traveling direction of the track 4. The θ drive 16 turns at least one of the elevation driver 18 and the elevation stage 20 within a predetermined angle range in a horizontal plane. The elevation driver 18 elevates and lowers the elevation stage 20 by reeling or unreeling a suspension member such as a belt, a wire, and a rope. The elevation stage 20 includes a chuck and can grip or release the article F. A pair of the front-back frames 22 are provided, for example, on the front and the back of the traveling vehicle 6 in the traveling direction. The front-back frames 22 extend and retract not-illustrated claws or the like and prevent the article F from dropping during transportation.

The traveling vehicle controller 24 may include a computer system or processor contained on an integrated circuit, for example. The traveling vehicle controller 24 is configured or programmed to execute various control processes of the traveling vehicle 6, and may include a central processing unit (CPU), a read only memory (ROM), a random access memory (RAM), and an input/output interface, for example. The ROM stores therein various programs or data. The traveling vehicle controller 24 can be configured, for example, as software that is a program stored in the ROM, loaded into the RAM, and executed by the CPU. The traveling vehicle controller 24 may be configured as hardware with electronic circuitry, for example.

The traveling vehicle controller 24 includes a storage 24A in which communication methods allowing communication for the respective sections S1 and S2 are associated with each other and stored. The storage 24A stores therein communication speeds for the respective sections S1 and S2. The storage 24A in the present example embodiment stores therein the fact that, in the main-line section S1, a communication device 37 described later in detail can communicate at 28.8 kbps and the fact that, in the branch-line section S2, the communication device 37 can communicate at 115.2 kbps. Although a right-side communication module 37A and a left-side communication module 37B illustrated in FIG. 3 will be described in a modification described later in detail, the right-side communication module 37A and left-side communication module 37B may be included in place of the communication device 37 in the present example embodiment.

The traveling unit 30 allows the traveling vehicle 6 to travel along the track 4. The traveling unit 30 mainly includes the traveling rollers 31, side rollers 32, a traveling driver 33, the power receiving device 35, and the communication device 37. The traveling rollers 31 roll on the lower surface portions 40B of the track 4. The traveling rollers 31 are disposed on the left and right ends at the front and the back of the traveling unit 30. The side rollers 32 are provided so as to be able to come into contact with the side surface portions 40C of the track 4. The traveling driver 33 preferably is a linear DC motor (LDM) and is provided at the front and the back of the traveling unit 30. The traveling driver 33 is provided with an electromagnet. The electromagnet produces magnetic force to cause the traveling vehicle 6 to accelerate or brake between the electromagnet and a magnetic plate 40F disposed on the upper surface of the track 4.

The power receiving device 35 is disposed at the front and the back of the traveling unit 30 so as to sandwich the traveling driver 33 in the left-right direction in plan view when viewed from above the traveling vehicle 6. At these power receiving devices 35, contactless power feeding from the power feeder 40E is performed. Each of the power receiving devices 35 includes a core (not illustrated) and a power receiving coil. The core is a core having, for example, an E-shaped cross-section orthogonal to the extending direction of the track 4. The core includes, for example, magnetic material such as ferrite. The power receiving coil includes, for example, wound copper wire coated with enamel or the like. The power receiving coil generates an induced current by a magnetic field generated by a current (high-frequency current) fed to the power feeder 40E, and this induced current supplies electricity to the elevation driver 18, the traveling vehicle controller 24, and the traveling driver 33 described above.

Similarly to the power receiving device 35, the communication device 37 is disposed at the front and the back of the traveling unit 30 so as to sandwich the traveling driver 33 in the left-right direction in plan view when viewed from above the traveling vehicle 6. At the communication devices 37, contactless communication with the area controller 70 is performed via the power feeder 40E. Each communication device 37 is configured or programmed to be able to switch the communication speed when communicating with the power feeder 40E. The communication device 37 in the present example embodiment is configured to be switchable between a state of being able to communicate with the power feeder 40E at 28.8 kbps and a state of being able to communicate therewith at 115.2 kbps, for example. The communication device 37 can communicate with the power feeder 40E by appropriately switching settings to match the communication speed in the power feeder 40E. For example, if the communication speed in the power feeder 40E is 28.8 kbps, by switching the setting of the communication device 37 to 28.8 kbps, and if the communication speed at power feeder 40E is 115.2 kbps, by switching the setting of the communication device 37 to 115.2 kbps, the communication device 37 and power feeder 40E will be able to communicate with each other.

The area controller 70 includes a CPU, a ROM, a RAM, and an input/output interface, for example. The traveling vehicle controller 24 can be configured, for example, as software that is a program stored in the ROM, loaded into the RAM, and executed by the CPU. The area controller 70 may be configured as hardware with, for example, electronic circuitry. The area controller 70 is configured or programmed to transmit a transport command to the traveling vehicle 6 to transport the article F.

The area controller 70 is configured or programmed to transmit and receive signals to and from the traveling vehicle 6 via the power feeder 40E disposed on the track 4. The area controller 70 connected to the power feeder 40E with a superimposed communication signal generator 71 interposed therebetween. The superimposed communication signal generator 71 causes the signals transmitted from the area controller 70 to be superimposed with high-frequency communication signals to be transmitted to the power feeder 40E. Furthermore, the area controller 70 is configured or programmed to transmit and receive signals to and from the traveling vehicle 6 through the communication method selected by the traveling vehicle controller 24. Specifically, the area controller 70 is configured or programmed to transmit and receive signals via the communication device 37, which is switched to the communication speed setting selected by the traveling vehicle controller 24. The superimposed communication signal generator 71 may be integrally configured as the area controller 70.

The area controller 70 is configured or programmed to transmit signals (performs polling communication) to a plurality of the traveling vehicles 6 traveling in turn. When the area controller 70 has control over, for example, three traveling vehicles 6 of first to third vehicles, it first transmits a signal containing the first vehicle as destination information to all traveling vehicles 6 in the area via the power feeder 40E, then transmits a signal containing the second vehicle as destination information to all traveling vehicles 6 in the area via the power feeder 40E, and then transmits a signal containing the third vehicle as destination information to all traveling vehicles 6 in the area via the power feeder 40E. The area controller 70 then continues to transmit and receive signals to and from the traveling vehicles 6 under its control in the order described above.

When each of the traveling vehicles 6 has received a signal transmitted from the area controller 70, it receives the signal as valid information only if the signal contains information indicating the vehicle itself as a destination. After the traveling vehicle controller 24 of the traveling vehicle 6 in the present example embodiment has switched the communication speed of the communication device 37 based on the information stored in the storage 24A, even if a signal received by the communication speed after this switching contains information indicating a vehicle other than the vehicle itself as a destination, the traveling vehicle controller 24 exceptionally receives the signal as valid information and determines s that communication with the area controller 70 has been established. The traveling vehicle controller 24 transmits the information thus determined to the area controller 70 via the communication device 37. If it has not been determined that communication has been established within a predetermined time (e.g., about 1 second when the cycle of the polling communication is 100 ms) after switching the communication method, that is, if a signal has been transmitted from the area controller 70 to the power feeder 40E but the signal cannot be received due to a difference in the setting of the communication method (communication speed), the traveling vehicle controller 24 of the traveling vehicle 6 in the present example embodiment returns the setting to the communication speed before the switching.

The following describes operation of switching the communication speed of the traveling vehicle 6. When a traveling vehicle 6 travels in the main-line section S1, it communicates with the area controller 70 via the communication device 37 that is set to be able to communicate with the power feeder 40E at 28.8 kbps. When the traveling vehicle 6 receives a signal transmitted from the area controller 70 while traveling in the main-line section S1, it receives the signal as valid information only if the signal contains information indicating the vehicle itself as a destination. For example, when the traveling vehicle 6 receives a transport command containing the vehicle itself as destination information from the area controller 70, it receives the transport command as valid information and starts moving to a placement section 9 contained in the transport command. Even if the traveling vehicle 6 has received a signal transmitted from the area controller 70 and containing information addressed to another vehicle, it does not receive the signal as valid information (even if it has received the signal, it does not perform any particular process).

A mark M1 such as a bar code is affixed to the track 4 upstream of a branch point BP in the main-line section S1. When a traveling vehicle 6 has received a command of transport to a placement section 9 on a route of the branch-line section S2, the traveling vehicle 6 enters the branch-line section S2 from the main-line section S1 through the branch point BP. In this case, when the traveling vehicle 6 approaches the branch point BP, the mark M1 located upstream near the branch point BP is read by a sensor (not illustrated). Triggered by the reading of the mark M1 by the sensor, the traveling vehicle controller 24 switches the setting of the communication speed in the communication device 37. More specifically, based on the information stored in the storage 24A, the traveling vehicle controller 24 switches the setting of the communication speed in the communication device 37 into a state of being able to communicate at 115.2 kbps, which is a communication speed corresponding to the branch-line section S2 that is a section to be entered, that is, a communication speed allowing communication with the power feeder 40E in the branch-line section S2.

After the traveling vehicle controller 24 has switched the communication speed in the communication device 37, even if a signal received at the communication speed after this switching contains information indicating a vehicle other than the vehicle itself as a destination, the traveling vehicle controller 24 receives the signal as valid information and determines that communication with the area controller 70 has been established. The traveling vehicle controller 24 transmits information indicating that communication with the area controller 70 has been established to the area controller 70. The traveling vehicle 6 then exchanges signals with the traveling vehicle controller 24 via the communication device 37 that is in the state of being able to communicate at 115.2 kbps, while traveling in the branch-line section S2. After transmitting the information indicating that communication with the area controller 70 has been established to the area controller 70, the traveling vehicle 6 receives a signal as valid information only if the signal contains information indicating the vehicle itself as a destination.

The traveling vehicle controller 24, after switching the communication speed in the communication device 37, restores the switched communication speed to the communication speed before being switched when it has not been determined that communication has been established within a predetermined time it returns to. Specifically, the traveling vehicle controller 24, after switching the communication speed in the communication device 37 to 115.2 kbps, restores the switched communication speed to 28.8 kbps that is the communication speed before being switched when it has not been determined that communication has been established within the predetermined time.

When the traveling vehicle 6 merges into a merging point CP, in the same manner as in the case of branching from the branch point BP, a mark M2 located upstream near the merging point CP is read by a sensor (not illustrated) when the traveling vehicle 6 approaches the merging point CP. Triggered by the reading of the mark M2 by the sensor, the traveling vehicle controller 24 switches the setting of the communication speed in the communication device 37. More specifically, based on the information stored in the storage 24A, the traveling vehicle controller 24 switches the setting of the communication speed in the communication device 37 into a state of being able to communicate at 28.8 kbps, which is a communication speed corresponding to the main-line section S1 that is a section to be entered, that is, a communication speed allowing communication with the power feeder 40E in the main-line section S1.

After the traveling vehicle controller 24 has switched the communication speed in the communication device 37, even if a signal received at the communication speed after this switching contains information indicating a vehicle other than the vehicle itself as a destination, the traveling vehicle controller 24 receives the signal as valid information and determines that communication with the area controller 70 has been established. The traveling vehicle controller 24 transmits information indicating that communication with the area controller 70 has been established to the area controller 70. The traveling vehicle 6 then exchanges signals with the traveling vehicle controller 24 via the communication device 37 that is in the state of being able to communicate at 28.8 kbps, while traveling in the main-line section S1. Specifically, after transmitting information indicating that communication with the area controller 70 has been established to the area controller 70, the traveling vehicle 6 receives a signal as valid information only if the signal contains information indicating the vehicle itself as a destination.

The operation and advantageous effects of the traveling vehicle system 1 in the above-described example embodiment will be described. In the traveling vehicle system 1 according to the example embodiment, after switching the communication speed, a signal is normally received as valid information through the communication speed after the switching only if the signal contains information indicating the vehicle itself as a destination, but the signal is received as valid information even if the signal contains information indicating a vehicle other than the vehicle itself as a destination (even if the signal contains information addressed to another vehicle traveling in the branch-line section S2). When having received such information, the traveling vehicle system 1 determines that communication with the area controller 70 has been established.

By this control, even if the area controller 70 has not transmitted a signal addressed to the vehicle itself after switching the communication speed, it can be determined that communication with the area controller 70 has been established based on a signal addressed to another vehicle. In other words, even if a signal addressed to the vehicle itself has not immediately been transmitted after the communication speed has been switched, it can be determined that communication with the area controller 70 has been established based on a signal addressed to another vehicle. Consequently, the time required to check whether communication between the area controller 70 and the traveling vehicle 6 has been established is shortened. In other words, in the traveling vehicle system 1 according to the present example embodiment, each of the traveling vehicles 6 can travel smoothly even when crossing areas with different communication speeds. This allows communication speeds to coexist in the track 4 included in the traveling vehicle system 1, making it easier to update the existing facilities and additionally install (add) a new facility.

In the traveling vehicle system 1 according to the present example embodiment, the traveling vehicle 6 travels along the track 4, the track 4 includes the power feeder 40E disposed along the track 4, and the traveling vehicle 6 and the area controller 70 communicate with each other via the power feeder 40E. With this configuration, even in the traveling vehicle system 1 in which communication is performed between the traveling vehicle 6 and the area controller 70 via the power feeder 40E, the time required to check whether communication between the area controller 70 and the traveling vehicle 6 has been established is shortened.

In the traveling vehicle system 1 according to the present example embodiment, the power feeder 40E also defines and functions as a feeder line for feeding power to the traveling vehicle 6. With this configuration, the power feeder 40E also defines and functions as the feeder line, resulting in a simple facility configuration and facilitating wiring work when the track 4 is constructed.

In the traveling vehicle system 1 according to the present example embodiment, the area controller 70 transmits a signal to the traveling vehicles 6 traveling in turn. However, even in the traveling vehicle system 1 in which such polling communication is performed, when the communication speed has been switched, the time required to check whether communication between the area controller 70 and the traveling vehicles 6 has been established is shortened.

In the traveling vehicle system 1 according to the present example embodiment, the traveling vehicle controller 24, after switching the communication speed, restores the switched communication speed to the communication speed before being switched when it has not been determined that communication has been established within the predetermined time. With this configuration, even if there is a gap between the timing of updating or expanding the system facilities such as a communication facility and a track facility that form the traveling vehicle system 1 and the timing of updating the information in the storage 24A, a situation in which communication is not established between the area controller 70 and the traveling vehicle 6 can be prevented and communication between the area controller 70 and the traveling vehicle 6 can be continued.

Although example embodiments have been described above, the present invention is not limited to the above-described example embodiments. Various modifications can be made without departing from the gist of the present invention.

First Modification

Figure 4:
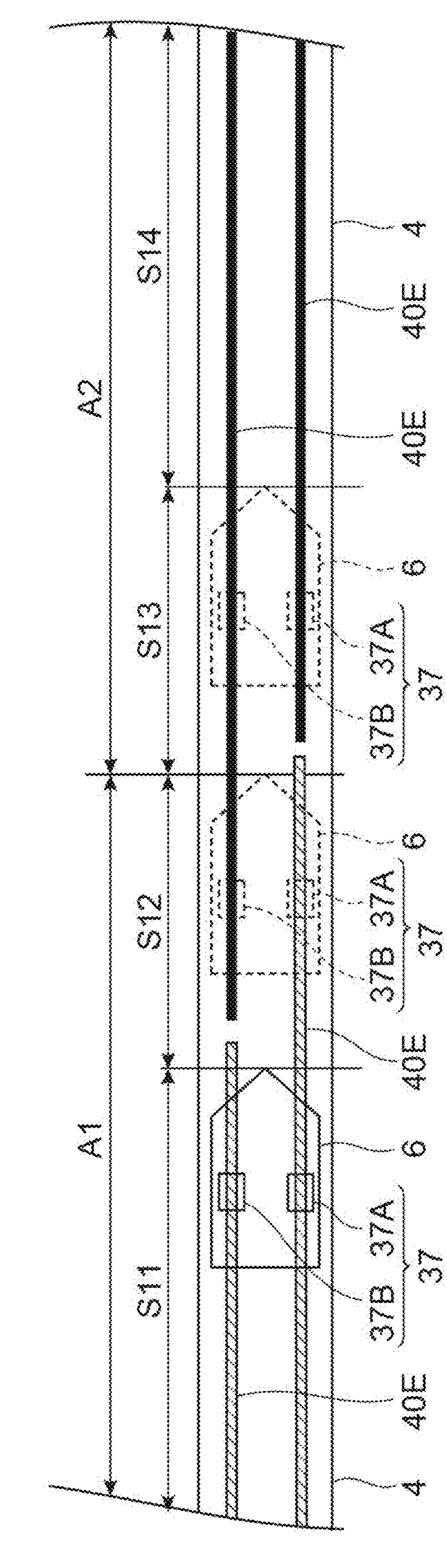
FIG. 4 is a diagram illustrating switching of communication methods in the traveling vehicle system according to a modification of an example embodiment of the present invention.

In the traveling vehicle system 1 according to the above example embodiments, an example has been described in which a communication speed of the communication device 37 to be switched is used as an example of the communication method to be switched by the traveling vehicle 6. However, the present invention is not limited to this. For example, when a traveling vehicle 6 travels across a boundary between areas controlled by different area controllers 70 as illustrated in FIG. 4, the traveling vehicle 6 (traveling vehicle controller 24) may switch the communication device, which enables communication with the power feeder 40E, between the right-side communication module 37A and the left-side communication module 37B as described below.

The following describes the right-side communication module 37A and the left-side communication module 37B. The right-side communication module 37A is a communication device configured or programmed to communicate with a power feeder 40E disposed on the right side in the traveling direction of the traveling vehicle 6 in the track 4. The left-side communication module 37B is a communication device configured or programmed to communicate with a power feeder 40E disposed on the left side in the traveling direction of the traveling vehicle 6 in the track 4. In other words, in the first modification, two communication devices are provided, whereas only one was provided in the above example embodiment.

The following describes a configuration of the track 4 in the front and the back of the boundary between the areas under control of the different area controllers 70. The area before the traveling across is denoted as an area A1, and the area after the traveling across is denoted as an area A2. In a normal section S11 in the area A1, power feeders 40E, 40E controlled by an area controller 70 having control over the area A1 (hereinafter, "power feeders 40E, 40E under area A1 control") are disposed on both sides of the track 4. In a boundary section S12 in the area A1, the power feeder 40E under area A1 control is disposed on the right side of the track 4, and a power feeder 40E controlled by an area controller 70 having control over the area A2 (hereinafter, "power feeder 40E under area A2 control") is disposed on the left side of the track 4. In a boundary section S13 in the area A2, power feeders 40E, 40E under area A2 control are disposed on both sides of the track 4. In a normal section S14 in the area A2, the power feeders 40E, 40E under area A2 control are disposed on both sides of the track 4 in the same manner as in the boundary section S13.

In the track 4 thus configured, when entering the boundary section S12, the traveling vehicle controller 24 switches from a state in which both the right-side communication module 37A and the left-side communication module 37B can communicate to a state in which only the right-side communication module 37A can communicate. Subsequently, when entering the boundary section S13, the traveling vehicle controller 24 switches from a state in which only the right-side communication module 37A can communicate to a state in which only the left-side communication module 37B can communicate. Subsequently, when entering the normal section S14, the traveling vehicle controller 24 switches from a state in which only the left-side communication module 37B can communicate to a state in which both the right-side communication module 37A and the left-side communication module 37B can communicate. By these switching operations of the communication device 37, the state in which the area controller 70 having control over the area A1 and the traveling vehicle 6 can communicate with each other is switched to the state in which the area controller 70 having control over the area A2 and the traveling vehicle 6 can communicate with each other.

In the present modification, also at the three switching operations when entering the boundary section S12, when entering the boundary section S13, and when entering the normal section S14, in the same manner as in the above example embodiments, the traveling vehicle controller 24 receives as valid information a signal received by the communication device 37 (the right-side communication module 37A and the left-side communication module 37B) after each switching even if the signal contains information indicating a vehicle other than the vehicle itself as a destination, thus determining that communication with the area controller 70 having control over the area A1 or the area controller 70 having control over the area A2 has been established. By this control, even when switching is performed between the right-side communication module 37A and the left-side communication module 37B, the time required to check whether communication between the area controller 70 having control over the area A1 or the area controller 70 having control over the area A2 and the traveling vehicle 6 has been established is shortened.

The switching in the first modification can be effectively used not only for the traveling across between different area controllers 70, but also, for example, for movement in the track 4 between a left-side wiring section where the power feeder 40E is disposed only on the left side in the traveling direction of the traveling vehicle 6 and a right-side wiring section where the power feeder 40E is disposed only on the right side in the traveling direction. In other words, even when the communication device 37 has been switched between the right-side communication module 37A and the left-side communication module 37B for movement from the left-side wiring section to the right-side wiring section, the time required to check whether communication between the area controller 70 and the traveling vehicle 6 has been established is shortened.

Other Modifications

In the example embodiments and the modifications above, an example has been described in which the traveling vehicle controller 24, after switching the communication speed, restores the switched communication speed to the communication speed before being switched when it has not been determined that communication has been established within the predetermined time. However, instead of this control, for example, the area controller 70 may, after switching the communication speed, perform polling communication with each of the traveling vehicles 6 in a predetermined cycle for a predetermined period, and then change the cycle to perform polling communication with the traveling vehicle 6.

In the example embodiments and the modifications above, examples have been described in which the storage 24A in which communication methods allowing communication for the respective sections S1 and S2 are associated with each other and stored is provided in the traveling vehicle controller 24. However, the present invention is not limited to this. For example, the storage 24A may be provided in the area controller 70, or a storage configured or programmed to communicate with the traveling vehicle controller 24 may be provided separately from the area controller 70.

In the example embodiments and the modifications above, examples have been described in which switching of the communication speed and switching between the left-side communication module and the right-side communication module are used as examples of switching of the communication method. However, for example, switching of frequencies or switching of wired or wireless communication in the communication device 37 may be used.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling vehicle system comprising:

a plurality of traveling vehicles configured to be able to select one of a plurality of communication methods and travel in a plurality of sections;

a storage in which the communication methods allowing communication for the respective sections are associated with each other and stored; and a controller configured or programmed to transmit and receive a signal through the corresponding communication method selected by each of the traveling vehicles, each of the traveling vehicles being configured to, when having received the signal transmitted from the controller, receive the signal as valid information only when the signal contains information indicating the vehicle itself as a destination; wherein after each of the traveling vehicles has switched the communication method stored in the storage in accordance with one of the sections that the traveling vehicle has entered, even when the signal received by the communication method after this switching contains information indicating a vehicle other than the vehicle itself as a destination, the traveling vehicle receives the signal as valid information and determines that communication with the controller has been established.

2. The traveling vehicle system according to claim 1, wherein the traveling vehicle is configured to travel along a track;

the track includes a communication line along the track; and the traveling vehicle and the controller communicate with each other via the communication line.

3. The traveling vehicle system according to claim 2, wherein the communication line defines and functions as a feeder line to feed power to the traveling vehicle.

4. The traveling vehicle system according to claim 2, wherein a communication device provided to each of the traveling vehicles includes a left-side communication module configured or programmed to communicate only with the communication line in a left-side wiring section and a right-side communication module configured or programmed to communicate only with the communication line in a right-side wiring section; and the switching of the communication method is a switching between the left-side communication module and the right-side communication module.

5. The traveling vehicle system according to claim 1, wherein the switching of the communication method is a switching of a communication speed between the traveling vehicle and the controller.

6. The traveling vehicle system according to claim 1, wherein the controller is configured or programmed to transmit the signal to the traveling vehicles traveling in turn.

7. The traveling vehicle system according to claim 1, wherein each of the traveling vehicles, after switching the communication method, is configured to restore the switched communication method to the communication method before being switched when it has not been determined that communication has been established within a predetermined time.

* * * * *